United States Patent
Lumbis et al.

(10) Patent No.: US 6,979,061 B1
(45) Date of Patent: Dec. 27, 2005

(54) METHOD AND DEVICE FOR SETTING ECP BRAKES TO MODES OF OPERATION

(75) Inventors: Anthony W. Lumbis, Watertown, NY (US); Gary S. Newton, Adams, NY (US); Bryan M. McLaughlin, Watertown, NY (US)

(73) Assignee: New York Air Brake Corporation, Watertown, NY (US)

( * ) Notice: Subject to any disclaimer, the term of this patent is extended or adjusted under 35 U.S.C. 154(b) by 0 days.

(21) Appl. No.: 10/871,382

(22) Filed: Jun. 21, 2004

(51) Int. Cl.[7] .............................................. B60T 13/00
(52) U.S. Cl. ............................................. 303/7; 303/3
(58) Field of Search ........................ 303/3, 7, 20, 22.2, 303/22.6, 86, 47; 340/502, 503, 504, 505; 73/39, 121, 129; 701/19, 20

(56) References Cited

U.S. PATENT DOCUMENTS

| | | | | |
|---|---|---|---|---|
| 5,317,751 A | * | 5/1994 | Novakovich et al. | 701/19 |
| 5,509,727 A | * | 4/1996 | Hart et al. | 303/3 |
| 5,873,638 A | * | 2/1999 | Bezos | 303/47 |
| 6,102,491 A | * | 8/2000 | Bezos | 303/47 |
| 6,173,849 B1 | | 1/2001 | Stevens et al. | |
| 6,175,784 B1 | * | 1/2001 | Jicha et al. | 701/19 |
| 6,227,625 B1 | * | 5/2001 | Gaughan | 73/121 |
| 6,484,085 B2 | | 11/2002 | Marra et al. | 303/22.6 |
| 6,519,720 B1 | * | 2/2003 | Mores | 701/19 |
| 6,648,425 B2 | | 11/2003 | Marra et al. | 303/22.6 |
| 2005/0085960 A1 | * | 4/2005 | Lumbis et al. | 701/19 |

* cited by examiner

*Primary Examiner*—Thomas Williams
(74) *Attorney, Agent, or Firm*—Barnes & Thornburg LLP

(57) ABSTRACT

A method of setting an electropneumatic brake device on a rail car to a mode of operation includes applying a wake-up voltage on a trainline to each brake device connected to the trainline. A command signal is sent to each brake device to enter a requested mode of operation. An acknowledgement signal is received from each of the brake devices on the trainline, and a command signal is sent to each brake device to stop broadcasting.

24 Claims, 3 Drawing Sheets

METHOD AND DEVICE FOR SETTING ECP BRAKES TO MODES OF OPERATION

BACKGROUND AND SUMMARY OF THE DISCLOSURE

The present invention relates generally to electrically-controlled pneumatic (ECP) brake systems and, more specifically, to the setting of modes of operation.

In some ECP standalone operations, trains are broken into small groups of approximately 10 cars for haulage at low speed by small industrial locomotives. These locomotives are fitted with relatively low capacity automotive electrical systems that are not capable of supporting the 2500-Watt Trainline Power Supply required for full ECP operation. The car control devices (CCDs) on these cars must, therefore, be capable of emulating the response of a conventional pneumatic brake control valve so they can be operated in the conventional pneumatic mode.

The AAR ECP Specification defines that once CCDs or electropneumatic brake devices are shutdown, they will restart (wake up) within two seconds after trainline voltage has reached 100 VDC. In order to ensure inter-operability among ECP suppliers, this wake-up function must be kept the same as defined by AAR specifications for this pneumatic emulation control function. Additionally, the CCDs are sent a communication message in order to enter the pneumatic emulation mode. This provides a specific or positive method to place the CCDs into this emulation mode or other "special" modes of operation, such as empty/load and functional test (apply/release).

The present method of setting an electropneumatic brake device on a rail car to a mode of operation includes applying a wake-up voltage on a trainline to each brake device connected to the trainline. A command signal is sent to each brake device to enter the mode of operation. An acknowledgment signal from each of the brake devices on the trainline is received, and a command signal to each brake device to stop broadcasting is sent.

A device for setting an electropneumatic brake device on a rail car to a mode of operation includes a trainline connector for connecting the device to a trainline, a wake-up voltage generator, and a transceiver for sending command signals to and receiving acknowledgment signals from each electropneumatic brake device on the trainline. A controller applies the wake-up voltage to the trainline, sends a command signal via the transceiver to the brake device to enter the mode of operation, receives an acknowledgment signal from each of the brake devices on the trainline from the transceiver, and sends a command signal to each brake device to stop broadcasting via the transceiver.

These and other aspects of the present disclosure will become apparent from the following detailed description of the disclosure, when considered in conjunction with accompanying drawings.

DETAILED DESCRIPTION OF THE PREFERRED EMBODIMENTS

The present method of setting an electropneumatic brake device on a railroad car to a pneumatic emulation mode or other modes of operation begins by applying a wake-up voltage on the trainline to each device connected to the trainline. Next, a command signal is sent to each brake device to enter the pneumatic emulation or other modes. Other "special" modes include empty, load, functional test (apply/release) and may be commanded in a similar manner. Then, each of the devices on the trainline sends back an acknowledgment signal. Upon receipt of the acknowledgment signals from each of the CCDs, a command signal is sent back to each of the devices to stop broadcasting. The signal may be performed over the trainline, as is presently known, or may be a wireless communication. The acknowledgment signal may be that each device has received the mode command or entered the requested mode and/or that the device is powered and communicating.

A determination is made as to how many devices have sent an acknowledgment signal. The number of acknowledgment signals is compared to the number of known electropneumatic brake devices on the trainline. If they match, the stop broadcasting command signal is sent. In most systems, either the locomotive or the portable device generates the wake-up voltage from a voltage source, which is substantially less than the wake-up voltage. This is performed by low to high voltage DC to DC converter. Because of the high voltage, a safety is built into the system. Activation of two switches, one by each hand, is required before the wake-up voltage can be applied to the trainline. Once the process is over and the stop broadcasting command has been sent, the controlling device may be disconnected from the trainline.

Figure 1:
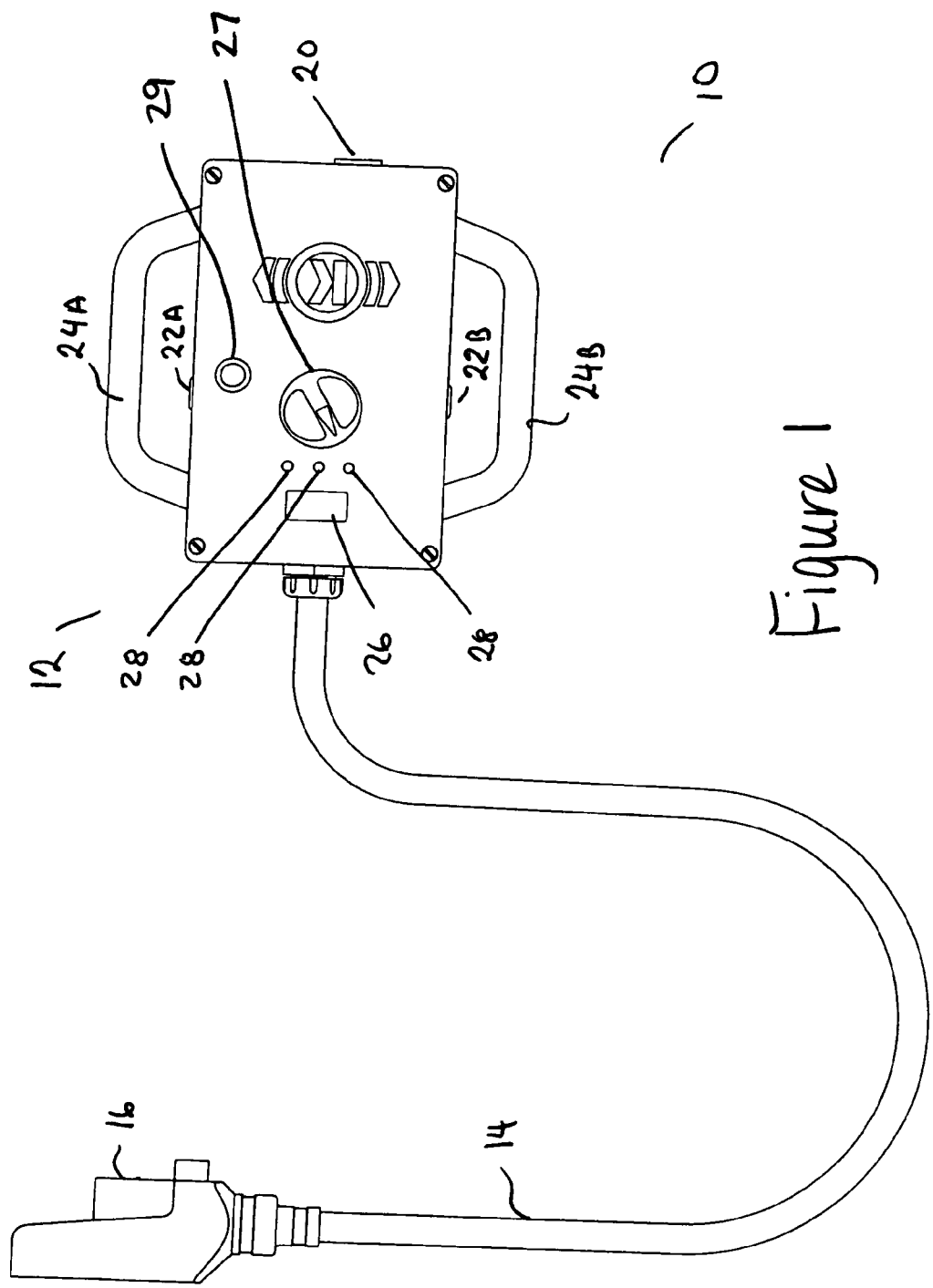
FIG. 1 is a plan view of a pneumatic emulation mode setting device, according to the principles of the present disclosure.
Figure 2:
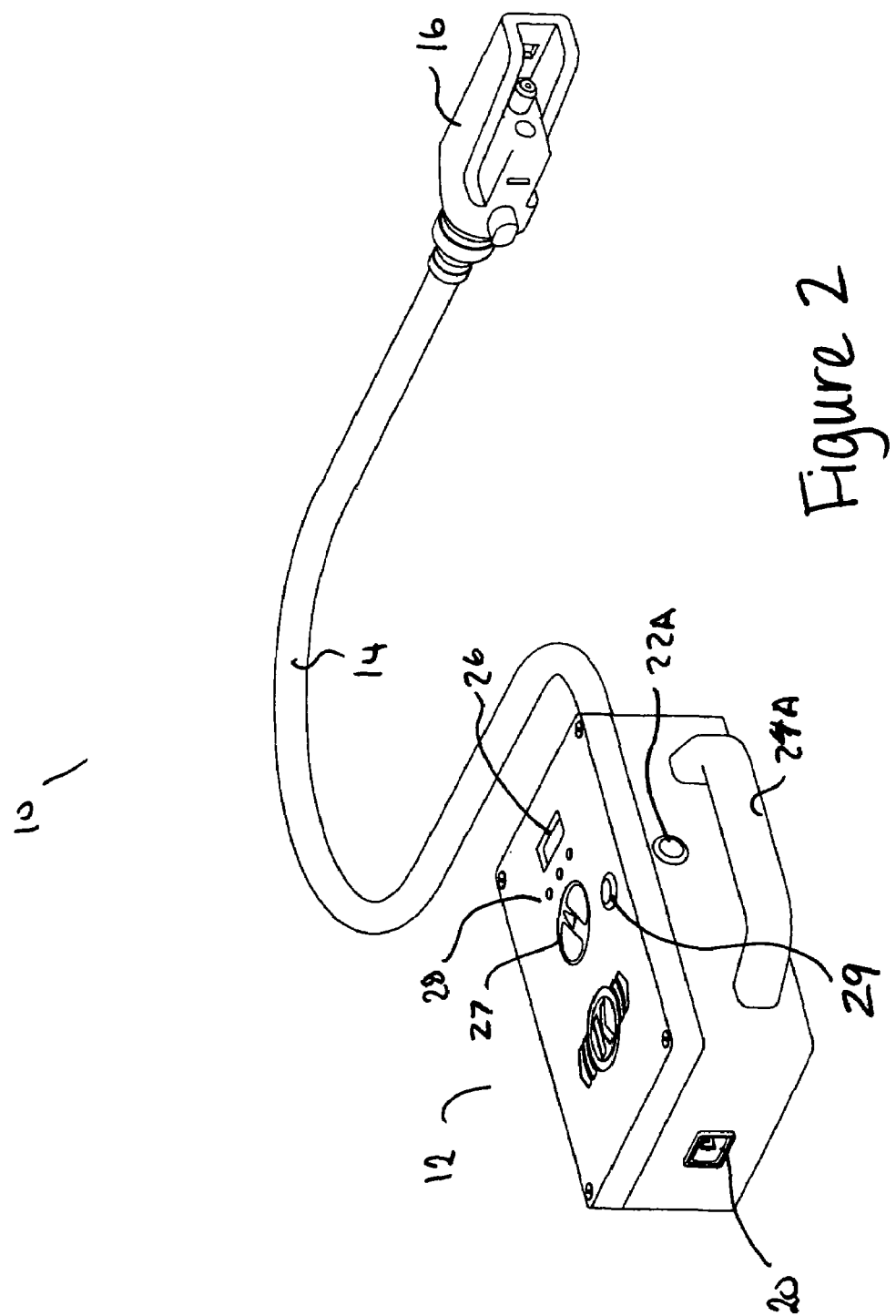
FIG. 2 is a perspective view of the device of FIG. 1.

Although the present disclosure will be described with respect to a portable device, as in FIGS. 1 and 2, the method may also be conducted by a device on the locomotive. The portable Trainline Energizing Device (TED) 10 includes a housing 12, with appropriate electronic and power sources, connected by a line 14 to a trainline connector 16. Although the configuration for the trainline connector 16 is shown as an AAR trainline connector, any other trainline connector can be used to mate with that of the train. The housing 12 includes a battery charging port 20. On opposite sides of the housing 12 are a pair of switches 22A, 22B. Adjacent the two switches 22A, 22B are two handles 24A, 24B. This allows gripping of the housing 12 and actuation of the switches 22A, 22B by, for example, the thumbs. This is a safety precaution such that the wake-up voltage is not applied until both switches 22A, 22B are activated. As illustrated, these are pushbutton switches, but other switches may be used. The switch 22A may be the system power-on switch, and switch 22B may be the trainline voltage application switch.

On the top of the housing 12 is a display 26, which may be a digital display. The number of responses from communicating devices will be illustrated on the display 26. Three indicators 28 are also provided on the top surface of the housing 12. The indicators 28 may be light emitting diodes or other illumination devices which indicate, for example, the trainline power status, the system power status and the communication status. Also, located on the top of the housing 12 is a mode selector switch 27 and a transmit switch 29. The mode selector switch 27 may be a rotary or other multiple position switch which is used to select the mode commands to be transmitted to the CCDs (for example, pneumatic emulation mode, empty or loaded mode, or special functional test (apply or release) mode). The transmit switch 29 is typically a pushbutton switch, but other types of switches may be used. The two switches 27, 29 may be combined. For example, a rotary mode selector, when depressed, will transmit the selected mode command.

While both switches 22A and 22B must be closed simultaneously for applying the high wake-up voltage, only the power-on switch 22A need be closed during transmission of the mode selection signal. After the wake-up signal, the other signals are at a substantially low voltage. If only a single mode is desired, the switches 27, 29 can be eliminated, and the mode selection signal would be sent automatically when the CCDs report power up.

Figure 3:
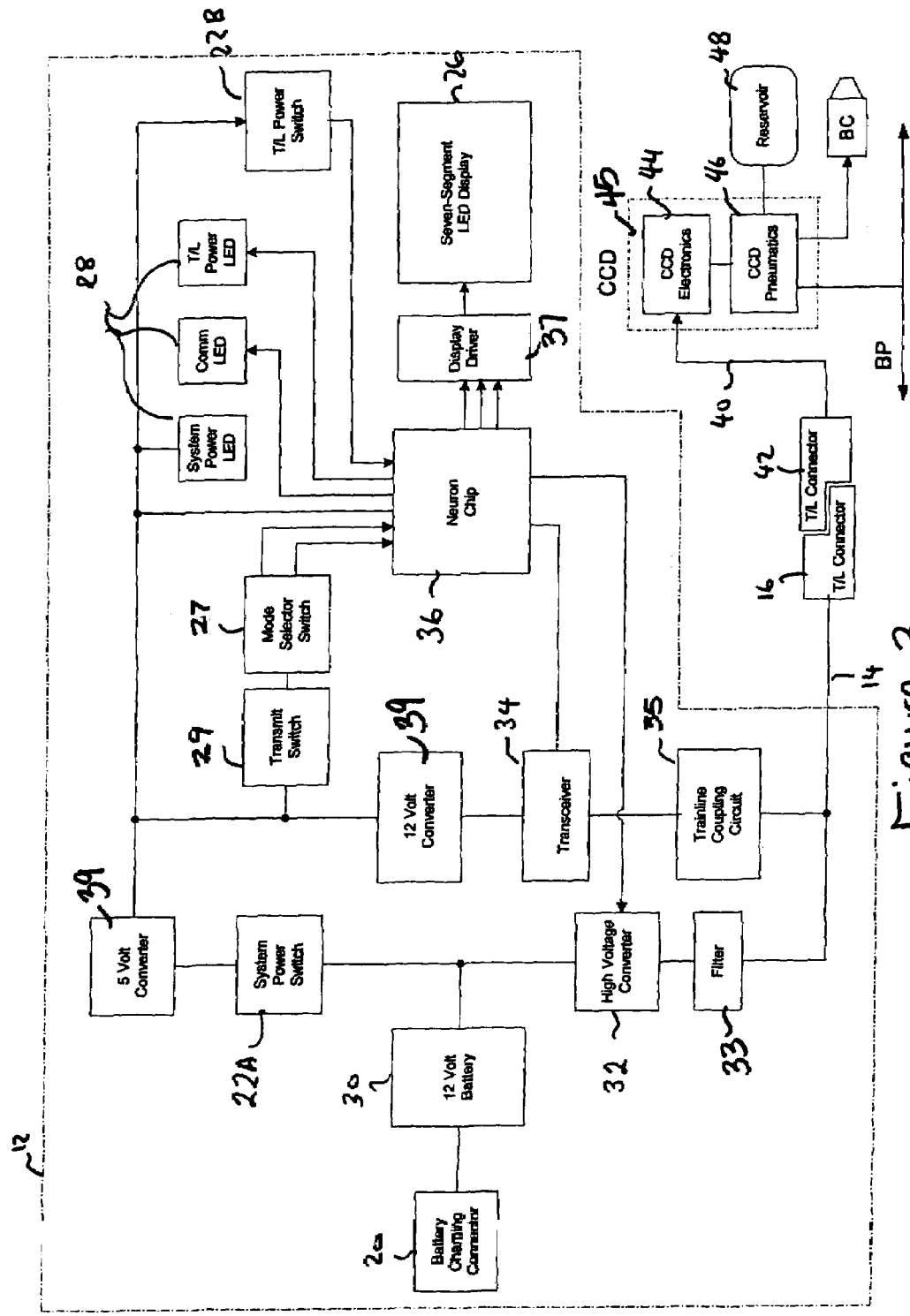
FIG. 3 is a schematic of a pneumatic emulation mode setting device.

FIG. 3 is a general schematic to understand the operation of the device in performing the method. A battery 30 is connected to the battery charging port 20. The battery may be, for example, a 12 VDC sealed lead acid battery. This may be the same battery that is used in the CCDs for the electropneumatic brake system. The battery 30 is connected to a voltage converting device 32. This may include a low to high voltage DC to DC converter or another device which converts voltage from the 12-volt battery to produce the required wake-up voltage. According to the AAR Specification, this is 100 VDC. The output of the voltage converting device 32 is connected to the cable 14 of the trainline connector 16 through a filter 33.

A transceiver 34 is also connected to the cable 14 of the trainline connector 16 through a trainline coupling circuit 35. The transceiver 34 may be an Echelon LONWORKS® PLT-22 transceiver. This is the system used in the example and the AAR Specification.

A controller 36 is provided and controls the voltage converting device 32 and transceiver 34. The controller 36 is also connected and receives inputs from the switches 22A and 22B, mode selector 27 and transmit switch 29. The controller 36 also controls the display 26 via display driver 37 and may control one or more of the three indicators 28. The controller 36 is responsive to the switches 22A, 22B to control the safe application of the power to the trainline 40 and responsive to switches 27, 29 to select and transmit the correct mode message to the CCDs. Additional voltage converters 39 are provided.

A trainline 40 is connected to trainline connector 16 by a connector 42. A CCD 45 at the car is connected to the trainline 40. The CCD 45 includes CCD electronics 44 which controls the CCD pneumatics 46, which takes air from a reservoir 48 and provides it to a brake cylinder BC. The CCD pneumatics 46 are connected to a brake pipe BP. In the pneumatic emulation mode, the CCD 45 is responsive to changes of the pressure in the brake pipe BP and controls the pressure in brake cylinder BC via the CCD pneumatics 46. The schematic of elements within housing 12 illustrated in FIG. 3 may be in the portable device of FIGS. 1 and 2 or may be a non-portable device located on the locomotive.

The TED 10 is used to "wake up" the CCDs 45 and command them to enter pneumatic emulation or other mode. This device 10 is a hand-held, portable device that provides both power and communications to the trainline 40 via a standard AAR-approved trainline connector 16. The TED 10 derives its power from a standard 12 VDC sealed lead acid battery 30 and provides an output of approximately 100 VDC for a predetermined period of time. As a safety feature, the 100 VDC output is interlocked through two pushbuttons 22A and 22B, located on opposite sides of the housing 12, that must both be depressed in order to activate the output. This action results in the output being applied to the trainline for a preset period of time regardless of how long the pushbuttons 22A, 22B are held depressed.

When activated, the device 10 also provides a communication message to poll the CCDs 45 on the network. Upon receiving the message, the CCDs 45 broadcast a message indicating that they are powered up and on line. Once the CCDs 45 are powered up and on line, the emulation mode or other special modes can be initiated by selecting the desired mode using mode selector switch 27 and activating the transmit switch 39. This results in the proper message being transmitted over the trainline 40 to the CCDs 45. Once the TED 10 receives an acknowledgment from each CCD that they received the mode message, the number of confirmed CCDs is tabulated and displayed on display 26, and the process is complete. The TED 10, upon confirmation, commands the CCDs 45 to stop broadcasting. This cycle takes less than 30 seconds to complete, for example. The timing is dependent on the number of cars energized. The TED 10 can energize up to 30 cars at one time and is capable of energizing approximately 1,000 cars before the 12 VDC battery needs recharging. Provisions are made for externally re-charging the battery 30 when the device is not in use. Additionally, LED indicators 28 are located on the front of the TED 10/12 to provide a visual status indication (for example, Stand-by, Communicating, and Power-On).

Upon completion of the energization/mode selection process, the TED 10 is disconnected from the trainline 40 and stored. Once in the emulation mode, the CCDs 45 would operate using their battery power and would receive pneumatic brake commands based on brake pipe pressure BP. The CCDs 45 would provide brake cylinder pressure control only. No other ECP functions/fault logic is provided.

Although the present disclosure has been described and illustrated in detail, it is to be clearly understood that this is done by way of illustration and example only and is not to be taken by way of limitation. The scope of the present disclosure is to be limited only by the terms of the appended claims.

What is claimed:

1. A method of setting an electropneumatic brake device on a rail car to a mode of operation, the method comprising:
    applying a wake-up voltage on a trainline to each electropneumatic brake device connected to the trainline;
    sending a command signal to each electropneumatic brake device to enter a mode of operation;
    receiving an acknowledgment signal from each of the electropneumatic brake devices on the trainline that they have entered the commanded mode of operation; and
    sending a command signal to the electropneumatic brake devices to stop broadcasting after receipt of the acknowledgment signal.

2. The method according to claim 1, wherein the signals are sent over the trainline.

3. The method according to claim 1, wherein the signals are sent wirelessly.

4. The method according to claim 1, including connecting a portable device to the trainline, applying the wake-up voltage and sending and receiving signals using the portable device.

5. The method according to claim 4, including disconnecting the device from the trainline after sending the stop communicating command signal.

6. The method according to claim 1, including providing an indication of the status of at least one of source voltage, trainline voltage and trainline communication.

7. The method according to claim 1, including generating the wake-up voltage from a voltage source of a substantially less voltage than the wake-up voltage.

8. The method according to claim 1, wherein the modes of operation includes at least electropneumatic and pneumatic emulation modes.

9. A method of setting an electropneumatic brake device on a rail car to a mode of operation, the method comprising:
   applying a wake-up voltage on a trainline to each electropneumatic brake device connected to the trainline;
   receiving an acknowledgment signal from each of the electropneumatic brake devices on the trainline;
   sending a command signal to each electropneumatic brake device to enter a mode of operation;
   determining how many electropneumatic brake devices have sent an acknowledgement signal; and
   sending a stop broadcasting command signal when the number of confirmation signals matches the number of known electropneumatic brake devices on the trainline.

10. A method of setting an electropneumatic brake device on a rail car to a mode of operation, the method comprising:
    connecting a portable device to the trainline;
    applying a wake-up voltage on a trainline to each electropneumatic brake device connected to the trainline only after activation of two switches, one by each hand;
    receiving an acknowledgment signal from each of the electropneumatic brake devices on the trainline;
    sending a command signal to each electropneumatic brake device to enter a mode of operation; and
    sending a command signal to the electropneumatic brake devices to stop broadcasting.

11. A device for setting an electropneumatic brake device on a rail car to a mode of operation, the device comprising:
    a trainline connector for connecting the device to a trainline;
    a wake-up voltage generator;
    a transceiver for sending command signals to and receiving acknowledgement signals from each electropneumatic brake device on the trainline; and
    a controller for applying the wake-up voltage to the trainline, sending a command signal via the transceiver to the electropneumatic brake device to enter a mode of operation, receiving an acknowledgement signal from each of the electropneumatic brake devices on the trainline that they have entered the commanded mode of operation from the transceiver, and sending a command signal to each electropneumatic brake device to stop broadcasting via the transceiver after receipt of the acknowledgment signal.

12. The device according to claim 11, wherein the device is in a portable housing.

13. The device according to claim 11, wherein the transceiver is connected to the trainline connector.

14. The device according to claim 11, wherein the transceiver is a wireless transceiver.

15. The device according to claim 11, including an indication of the status of at least one of source voltage, trainline voltage and trainline communication.

16. The device according to claim 11, including a mode selection device connected to the controller.

17. The device according to claim 16, wherein the mode selection device selects between at least electropneumatic and pneumatic emulation modes.

18. The device according to claim 11, including a display of the number of acknowledgement signals received.

19. The device according to claim 11, including the generator which includes a voltage source of a substantially less voltage than the wake-up voltage and charges a storage device to generate the wake-up voltage.

20. The device according to claim 19, including a charging port for the voltage source.

21. A device for setting an electropneumatic brake device on a rail car to a mode of operation, the device comprising:
    a trainline connector for connecting the device to a trainline;
    a wake-up voltage generator;
    a transceiver for sending command signals to and receiving acknowledgement signals from each electropneumatic brake device on the trainline; and
    a controller for applying the wake-up voltage to the trainline, sending a command signal via the transceiver to the electropneumatic brake device to enter a mode of operation, receiving an acknowledgement signal from each of the electropneumatic brake devices on the trainline from the transceiver, determining how many electropneumatic brake devices have sent an acknowledgement signal, and sending stop broadcasting command signal when the number of acknowledgement signals matches the number of known electropneumatic brake devices on the trainline.

22. A device for setting an electropneumatic brake device on a rail car to a mode of operation, the device comprising:
    a trainline connector for connecting the device to a trainline;
    a wake-up voltage generator;
    a transceiver for sending command signals to and receiving acknowledgement signals from each electropneumatic brake device on the trainline;
    two switches; and
    a controller for applying the wake-up voltage to the trainline only after the two switches have been activated, one by each hand, sending a command signal via the transceiver to the electropneumatic brake device to enter a mode of operation, receiving an acknowledgement signal from each of the electropneumatic brake devices on the trainline from the transceiver, and sending a command signal to each electropneumatic brake device to stop broadcasting via the transceiver.

23. The device according to claim 22, including a handle adjacent each switch.

24. The device according to claim 22, wherein the switches are on adjacent opposed sides of a housing of the device.

* * * * *